United States Patent [19]

Nahodyl

[11] 4,085,911
[45] Apr. 25, 1978

[54] VERTICAL TAKEOFF AND LANDING AIRCRAFT

[75] Inventor: Richard J. Nahodyl, Massapequa Park, N.Y.

[73] Assignee: Grumman Aerospace Corporation, Bethpage, N.Y.

[21] Appl. No.: 799,510

[22] Filed: May 23, 1977

Related U.S. Application Data

[63] Continuation of Ser. No. 699,388, Jun. 24, 1976, abandoned.

[51] Int. Cl.² ............................................. B64C 1/30
[52] U.S. Cl. ................................. 244/12.4; 244/120
[58] Field of Search ............ 244/12.4, 91, 120, 119, 244/6, 7 R; D12/71, 79

[56] References Cited

U.S. PATENT DOCUMENTS

| 2,780,424 | 2/1957 | Price | 244/12.4 |
| 2,961,189 | 11/1960 | Doak | 244/12.4 |
| 3,065,929 | 11/1962 | Holland | 244/12.4 |
| 3,966,142 | 6/1976 | Corbett et al. | 244/12.4 |

FOREIGN PATENT DOCUMENTS

| 909,923 | 11/1962 | United Kingdom | 244/12.4 |

*Primary Examiner*—Barry L. Kelmachter
*Attorney, Agent, or Firm*—Arthur S. Haapaniemi; Mellor A. Gill

[57] ABSTRACT

A vertical takeoff and landing aircraft having a tail assembly supporting structure which is pivotally connected to the fuselage, and having a shrouded fan driven by an engine submerged in the fuselage, the shrouded fan being connected to and rotatable with the tail supporting structure so as to direct the slipstream of the shrouded fan over the tail assembly at all times.

1 Claim, 8 Drawing Figures

4,085,911

VERTICAL TAKEOFF AND LANDING AIRCRAFT

This is a continuation, of application Ser. No. 699,388 filed June 24, 1976, now abandoned.

FIELD OF INVENTION

The invention relates to fixed wing aircraft and has particular reference to vertical takeoff and landing aircraft.

SUMMARY OF THE INVENTION

The VTOL aircraft of this invention is a fixed wing vehicle of the type described in U.S. Pat. No. 3,966,142 for "Vertical Takeoff and Landing Aircraft" and assigned to the assignee of this application. The aircraft there disclosed includes an articulated fuselage structure wherein the tail section (the rear portion of the fuselage) is in line with the longitudinal axis of the aircraft during normal flight but during takeoff and landing maneuvers, the tail section is substantially vertical. During transition, the tail section moves from one position to the other. Vectored flight propulsion is achieved by rotating the thrust axis of the propulsion means so as to provide the vertical thrust for takeoff and landing and longitudinal thrust for normal flight. In all flight modes from takeoff to normal flight and back to landing, the aerodynamic control surfaces of the tail section are immersed in the efflux of the engines to provide the attitude and flight control forces required as the surfaces are deflected in the slipstream.

In this invention the engine is submerged in the body of the fuselage and does not rotate with respect to the airframe structure. The engine drives a pair of ducted fans which provide the propulsive forces and which are rotatable to provide vectored thrust as described. The tail surfaces are at the extremity of a supporting structure which is rotatable with the fans. Thus hot engine exhaust is not directed at the tail surface and the tail surfaces operate in a lower thermal environment. Also, the engine exhaust is never directed vertically against a ships deck, the water or the ground thereby reducing exposure of personnel and equipment to possible hazards. Futhermore, the engine comprises a considerable percentage of the overall weight of the aircraft and by keeping that mass stationary, the auxiliary controls for rotating the thrust and tail structure can be simplified.

For takeoff, the aircraft is supported by its landing gear resting on a platform which is structured to receive the aircraft's landing gear and support same horizontally and vertically. The aircraft is held by its landing gear until its engine can provide the force necessary for liftoff, at which time the aircraft is released. It proceeds away from the platform in the vertical flight mode, then transitions to the horizontal flight mode as the tail section is drawn up to reduce the break angle of the tail supporting structure, climbing all the time, as demanded, and finally proceeds away from the launching site to fulfill its mission as a conventional flight configured aircraft.

In landing the above process is reversed. After landing, and after the aircraft is securely attached to the platform the engine of the aircraft is shutdown.

The wing is maintained at the desired angle of attack for maximum efficiency and is thus prevented from stalling during transition between vertical and horizontal flight which may occur in a conventional "tail sitter" or tilt wing aircraft. An additional advantage of this arrangement is that the effects of horizontal wind gusts when hovering near the surface are reduced by maintaining the wing parallel to the surface with only the smaller rear section being in the directions of the gusts.

The design of the articulated VTOL aircraft is such that the aircraft's tail control surfaces always remain immersed in the fan slipstream whether the aircraft is being operated in the VTOL mode or in a level flight mode. The control surfaces therefore remain effective as long as the fans continue to provide air flow over it, eliminating the requirement for the aircraft to maintain forward velocity or to be burdened with a reaction control system for control system effectiveness.

In the case of an air launched remotely piloted vehicle, the launching can be made with the aircraft in a normal configuration and only the vertical landing will be accomplished as herein described.

BRIEF DESCRIPTION OF DRAWINGS

For a more complete understanding of the invention reference may be had to the accompanying drawings, in which.

DESCRIPTION OF THE PREFERRED EMBODIMENTS

Figure 1C:
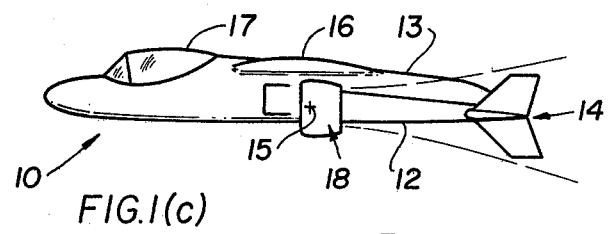
FIG. 1(c) shows the aircraft of FIG. 1(a) in the normal flight mode.
Figure 1B:
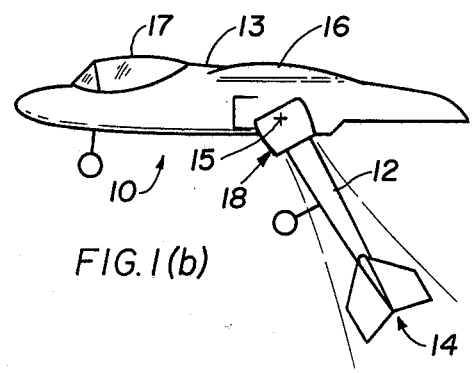
FIG. 1(b) shows the aircraft in a transition mode.
Figure 1A:
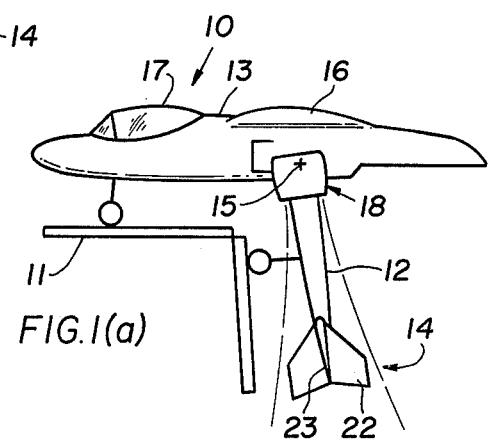
FIG. 1(a) is a side view of the aircraft in the takeoff or landing mode.

With reference now to FIGS. 1(a), 1(b), and 1(c) of the drawings there are shown three modes, or configurations of the preferred embodiment of the aircraft in various stages of flight. In FIG. 1(a) the aircraft 10 is resting on a launching platform 11 in a takeoff or landing mode in which the tail supporting structure 12 is vertically disposed; in FIG. 1(b), the aircraft 10 is in a transition mode wherein the tail supporting structure 12 is between vertical or horizontal and in FIG. 1(c) the aircraft 10 is in the normal flight mode wherein the tail supporting structure 12 is horizontal. As seen in FIG. 1, aircraft 10 includes a fuselage 13, and a tail supporting structure 12 which are joined at a hinge connection 15. The connection 15 permits relative rotation of the structure 12 which carries the tail assembly 14 with respect to the fuselage 13 about a pitch axis of aircraft 10 through the hinge connection 15.

The fuselage 13 carries the fixed wings 16 and cockpit 17, while the tail supporting structure 12 carries the ducted fan propulsion means 18 which are mounted on the structure 12 so as to create a slipstream which impinges on and washes the tail assembly 14 in all configuration modes of the aircraft 10. The slipstream in impinging on the rudder surfaces 22, 22 and elevon surfaces 23 of the assembly 14 provides the forces necessary to maneuver the aircraft even when the aircraft is not in the normal flight mode, FIG. 1(c).

As will be readily understood by one skilled in the art, control of the airplane in the conventional flight mode will be by rudder means 22 for yaw control, elevons 23 in pitch when symmetrically operated and elevons 23 in roll when differentially operated. In the VTOL mode, it will be necessary to change the function of these controls as by means mechanical or electrical to wash out the connection of the rudder control to the rudder means and the differential elevon control to the elevators while connecting said rudder means. Therefore, in the takeoff configuration, FIG. 1(a) the rudder controls motion in roll and the differentially displaced elevons control motion in yaw. In the transition mode, FIG. 1(b), the rudder and differential elevon displacements will each produce motions in both roll and yaw, the effect of each being trigonometrically related to the tilt angle $\theta$, i.e. the angle between the fuselage 13 and the structure 12. The effect of symmetrical elevon displacement is always a motion in pitch and does not change with tilt angle $\theta$. Accordingly, by directing the slipstream over the control surfaces 22, 23 the aircraft can be maneuvered in all configurations without accessory equipment.

Figure 2:
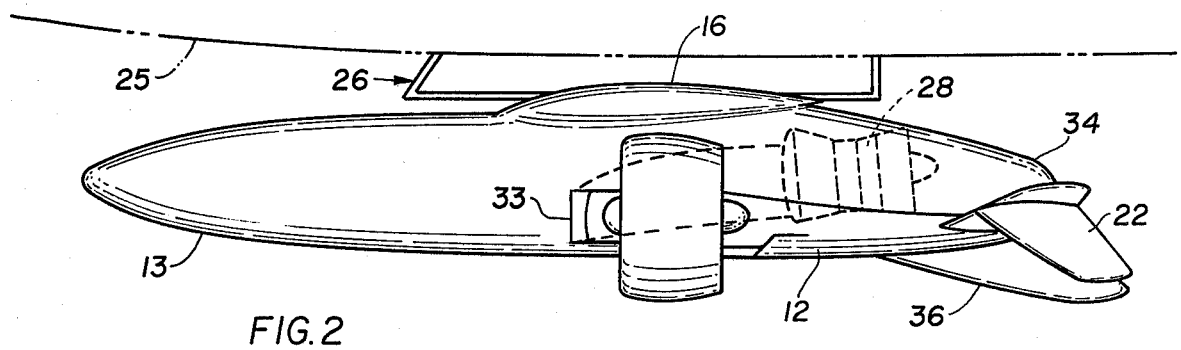
FIG. 2 is a detailed view of the aircraft of FIG. 1(c)
Figure 3:
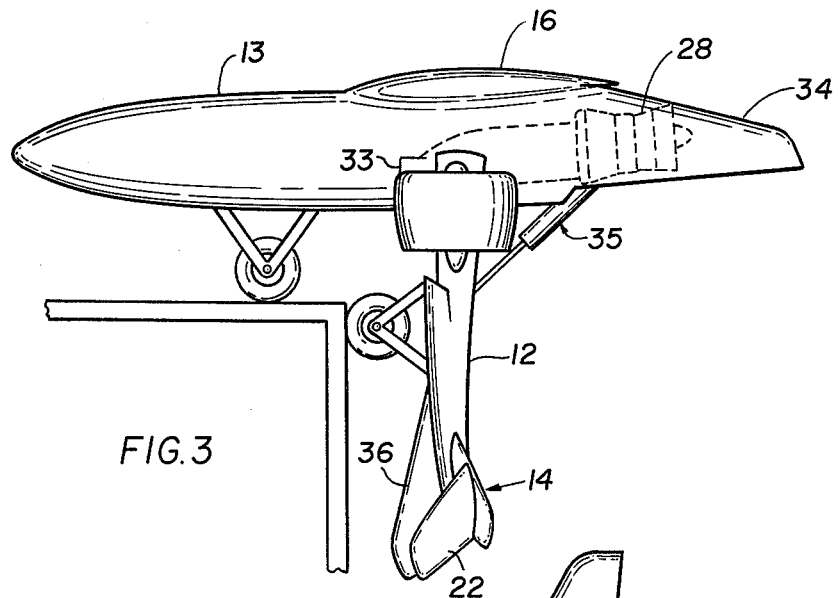
FIG. 3 is a detailed view of the aircraft in FIG. 2.
Figure 4:
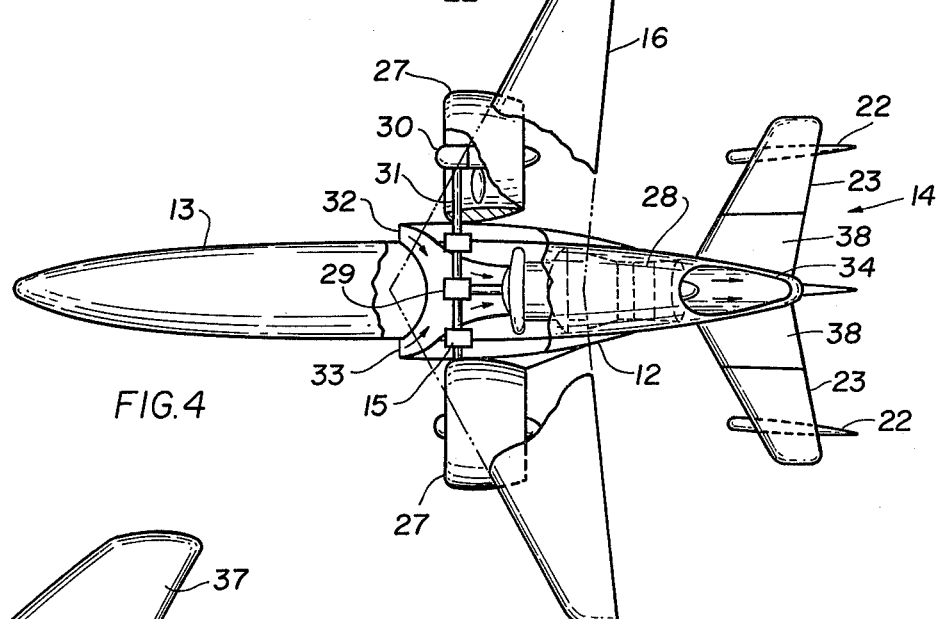
FIG. 4 is a plan view of an aircraft of FIG. 2.

FIGS. 2, 3 and 4 show more details of one embodiment of aircraft than evident in FIGS. 1(a) – 1(c). The aircraft might be a remotely piloted vehicle capable of air launch from the underbelly of a large aircraft 25 or from wing pylons 26 in its normal configuration, FIG. 2, or vertical takeoff from the earth's surface (land or water) from a platform 11 as in FIG. 3. Vertical landing would be accomplished on to a platform 11 where runways are not available; normal glide landings would be accomplished where runways are available.

As seen in FIGS. 2, 3, and 4 the RPV Aircraft includes the fuselage 13 wings 16, tail 14 supporting structure 12, and fans 27 on the structure 12. The fans 27 are driven by the engine 28 which is submerged in the fuselage 13 through appropriate gearing 29, 30 and shafting 31 (FIG. 4) as is well known in the art. Air scoops 32, 33 and an exhaust port 34 for the engine 28 are provided in the fuselage 13.

The supporting structure 12 rotates about pivots 15 through which the shafts 31 penetrate the fuselage 13. Each pivot 15 comprises a double bearing (not detailed) providing for free rotation of shaft 31 within an inner bearing and relative rotation of structure 12 and fuselage 13 within an outer bearing. A hydraulic actuator 35 rotates structure 12 about pivot 15. The actuator 35 in FIG. 3 is positioned as shown for illustrative purposes and in reality would be closer to pivot 15 and hidden from view.

Figure 5:
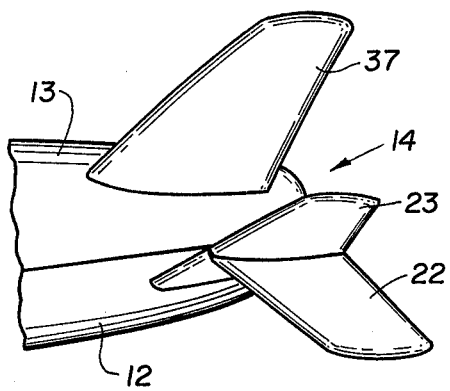
FIG. 5 is a detail of vertical fins on the fuselage.
Figure 6:
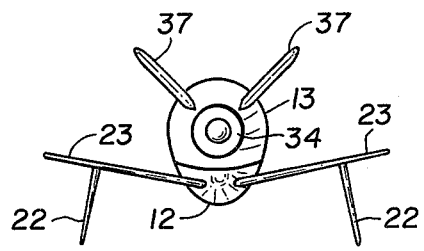
FIG. 6 is a rear view of the fins of FIG. 5.

The tail section 14 includes rudder surfaces 22 and elevon surfaces 23 which are located in the slipstream of the fans 27. The lower vertical fin 36 on the supporting structure 12 is to provide clearance between the underbelly of the launching aircraft 25 and the launched aircraft 10. FIGS. 5 and 6 show upright vertical fins 37 attached to the fuselage 13 for platform and conventional takeoff and landing as seen from the side and rear. Horizontal fins 38 are part of the tail assembly 14 in the embodiment illustrated.

It will be seen that in this invention the engine is maintained fixed to the fuselage and only the fans are rotated to change the direction of the thrust. The relatively small structure 12, can be rotated with little power and with small displacement of the location of the center of gravity of the aircraft in the various modes.

Although the invention has been described as embodied in a remotely piloted vehicle, its use is not limited thereto. FIG. 1, for example, shows a vehicle with a cockpit in the fuselage which implies man piloted vehicle. Many other variations may be made without departing from the spirit of the invention. The shrouded fans may be driven by a pair of engines as in common practice for safety. The tail assembly may carry only the movable surfaces or both movable and fixed surfaces as desired.

It should thus be recognized that the invention is not to be limited to the preferred embodiment described herein, but that the invention falls within the scope of the appended claims.

I claim:
1. An aircraft comprising:
 a fuselage having air inlet means for a cavity having an opening at the rear thereof;
 wings fixed to said fuselage and extending from an upper portion of said fuselage on each side thereof;
 a separate longitudinal supporting structure carrying a tail assembly including movable aerodynamic control surfaces at one end thereof, said surfaces being elevon and rudder surfaces located on each side of said fuselage and beneath said fuselage;
 an engine means submerged in the cavity of said fuselage between said air inlet means and said opening which forms an exhaust port for said engine means;
 a plurality of ducted fan means attached to said longitudinal supporting structure, at least one of said ducted fan means on each side of said fuselage, said ducted fan means being under said wings and exhausting air flow over and about said aerodynamic control surfaces under said fuselage;
 operative connections between said engine means and said ducted fan means for driving said ducted fan means and for producing the exhausting air flow and thrust thereby; and
 means to pivot said longitudinal supporting structure under and away from said fuselage whereby said longitudinal supporting structure will pivot said ducted fan means about an axis transverse to said fuselage to a position substantially normal to and under said wings to change the direction of thrust produced by said fan means, and whereby said aerodynamic control surfaces remain immersed in the slipstream from said ducted fan means at all positions of said longitudinal supporting structure to effect yaw, roll and pitch movements of said aircraft upon displacement of said aerodynamic control surfaces.

* * * * *